US011873207B2

(12) United States Patent
Hagerty

(10) Patent No.: US 11,873,207 B2
(45) Date of Patent: Jan. 16, 2024

(54) BEVERAGE-DISPENSING KEG

(71) Applicant: John C. Hagerty, Louisville, KY (US)

(72) Inventor: John C. Hagerty, Louisville, KY (US)

(73) Assignee: World Wide Hagerty Inc., Louisville, KY (US)

( * ) Notice: Subject to any disclaimer, the term of this patent is extended or adjusted under 35 U.S.C. 154(b) by 53 days.

(21) Appl. No.: 17/538,316

(22) Filed: Nov. 30, 2021

(65) Prior Publication Data

US 2023/0166963 A1 Jun. 1, 2023

(51) Int. Cl.
*B67D 3/00* (2006.01)
*B67D 3/04* (2006.01)

(52) U.S. Cl.
CPC ............. *B67D 3/04* (2013.01); *B67D 3/0061* (2013.01); *B67D 3/0067* (2013.01); *B67D 3/0083* (2013.01); *B67D 2210/00062* (2013.01)

(58) Field of Classification Search
CPC .................... B67D 3/04; B67D 3/0067; B67D 2210/00062; B67D 3/0061; B67D 3/0083
See application file for complete search history.

(56) References Cited

U.S. PATENT DOCUMENTS 3,453,033 A * 7/1969 Goss ........................ B67D 3/00 220/663
3,613,954 A * 10/1971 Bayne .................. B67D 1/0412 222/61
3,696,969 A * 10/1972 De Van ................ B67D 3/0019 222/105
4,264,019 A * 4/1981 Roberts ................ B67D 1/0412 222/105
4,351,455 A * 9/1982 Bond ................... B65D 47/283 222/522
4,921,135 A * 5/1990 Pleet .................... B67D 1/0869 222/105
4,997,108 A * 3/1991 Hata ...................... B67D 3/043 251/351
5,022,560 A * 6/1991 Campbell ............... B25B 13/48 285/39
5,067,636 A * 11/1991 Pfeiffer .................. B65D 77/06 222/105
6,260,823 B1 * 7/2001 Weber ................ B65D 51/1683 222/481.5
6,401,989 B1 * 6/2002 Grittmann .............. B67D 3/043 251/351
7,246,721 B2 * 7/2007 Pritchard ............... B67D 3/045 222/105
7,434,705 B2 * 10/2008 Evangelista ........... B65D 77/06 222/105
7,584,873 B2 * 9/2009 Grittmann ............ B67D 1/1422 222/394

(Continued)

*Primary Examiner* — Frederick C Nicolas
(74) *Attorney, Agent, or Firm* — Dinsmore & Shohl LLP

(57) ABSTRACT

A system for dispensing a beverage from at least one pouch having a first dispensing apparatus is provided herein, the system including: a keg defining a longitudinal axis, an inner surface, and an outer surface; a first aperture extending from the inner surface of the keg to the outer surface of the keg, the first aperture configured to receive the first dispensing apparatus; and a first outer clip positioned to abut the outer surface of the keg and encircle a first portion of the first dispensing apparatus. Also provided herein are methods of assembling and using the beverage-dispensing apparatus.

18 Claims, 7 Drawing Sheets

(56) References Cited

U.S. PATENT DOCUMENTS

| | | | | |
|---|---|---|---|---|
| 8,091,378 | B1 * | 1/2012 | Farias, III | F25D 3/06<br>62/239 |
| 8,967,433 | B2 * | 3/2015 | McKenna | B67D 3/04<br>222/105 |
| 9,090,443 | B1 * | 7/2015 | Malinski | B67D 3/0067 |
| 9,440,838 | B1 * | 9/2016 | Paige | B67D 3/0067 |
| 2003/0178449 | A1 * | 9/2003 | Batschied | B67D 3/045<br>222/559 |
| 2005/0236426 | A1 * | 10/2005 | Verespej | B65D 77/06<br>222/105 |
| 2008/0041892 | A1 * | 2/2008 | Neukirch | B67D 1/1466<br>222/538 |
| 2012/0318821 | A1 * | 12/2012 | Merner | B67D 3/04<br>222/105 |
| 2012/0318824 | A1 * | 12/2012 | McKenna | B67D 3/0083<br>222/105 |
| 2015/0266713 | A1 * | 9/2015 | Peirsman | B67D 1/0839<br>222/394 |
| 2016/0128351 | A1 * | 5/2016 | Rubin | B67D 3/0012<br>222/95 |
| 2019/0023555 | A1 * | 1/2019 | Smith | B67D 3/041 |
| 2019/0055114 | A1 * | 2/2019 | Bell | B65D 77/067 |

* cited by examiner

BEVERAGE-DISPENSING KEG

TECHNICAL FIELD

The present specification generally relates to beverage-dispensing kegs, assemblies, and methods.

BACKGROUND

Kegs are often used for transporting and dispensing beverages. Such kegs are commonly made from wood; however, a keg constructed from metal, such as stainless steel, plastic, or other material may be lighter and more easily transportable. Kegs may impart undesired flavors to the beverage if the beverage is directly in contact with the walls of the keg. Accordingly, it may be desirable for a beverage-dispensing keg to accommodate a beverage pouch with a dispensing apparatus therein.

SUMMARY

Additional features and advantages of the present disclosure will be set forth in the detailed description, which follows, and in part will be apparent to those skilled in the art from that description or recognized by practicing the embodiments described herein, including the detailed description, which follows the claims, as well as the appended drawings.

In a first aspect A1, a system for dispensing a beverage from at least one pouch having a first dispensing apparatus includes a keg, a first aperture, and a first outer clip. The keg defines a longitudinal axis, an inner surface, and an outer surface. The first aperture extends from the inner surface of the keg to the outer surface of the keg and is configured to receive the first dispensing apparatus. The first outer clip is positioned to abut the outer surface of the keg and encircle a first portion of the first dispensing apparatus.

In a second aspect A2 according to the first aspect A1, the first aperture extends radially outward relative to the longitudinal axis of the keg. In a third aspect A3 according to any preceding aspect, the first dispensing apparatus comprises an outer groove, and the first outer clip is configured to couple to the outer groove of the first dispensing apparatus with a snap-fit mechanism. In a fourth aspect A4 according to any preceding aspect, the outer groove defines a groove diameter, and the first outer clip has a minimum width smaller than the groove diameter. In a fifth aspect A5 according to any preceding aspect, the system further includes a first inner clip positioned to abut the inner surface of the keg and encircle a second portion of the first dispensing apparatus. In a sixth aspect A6 according to the fifth aspect A5, the first dispensing apparatus comprises an inner groove, wherein the first inner clip is configured to couple to the inner groove of the first dispensing apparatus with a snap-fit mechanism. In a seventh aspect A7 according to any preceding aspect, the first outer clip comprises a tab extending radially outward relative to the longitudinal axis of the keg. In an eighth aspect A8 according to any preceding aspect, the keg comprises a removable keg base, longitudinally recessed within the keg. In a ninth aspect A9 according to any preceding aspect, the system further includes a second aperture extending from the inner surface of the keg to the outer surface of the keg, the second aperture configured to receive a second dispensing apparatus of the at least one pouch. In a tenth aspect A10 according to the ninth aspect A9, the system further includes a second outer clip configured to couple to the second dispensing apparatus. In an eleventh aspect A11 according to any preceding aspect, the system further includes a divider, the divider defining a plurality of radially extending walls, wherein the divider is configured to receive the at least one pouch between the plurality of radially extending walls. In a twelfth aspect A12 according to the eleventh aspect A11, the keg comprises a plurality of divider channels, each of the plurality of divider channels configured to receive one of the plurality of radially extending walls.

In a thirteenth aspect A13, a system for dispensing liquor from at least one pouch having a first dispensing apparatus includes a keg, a removable keg base, a first aperture, and a first outer clip. The keg defines a longitudinal axis, an inner surface, and an outer surface. The removable keg base is coupled to a bottom of the keg. The first aperture radially extends from the inner surface of the keg to the outer surface of the keg and is configured to receive the first dispensing apparatus. The first outer clip is positioned to abut the outer surface and encircle a second portion of the first dispensing apparatus.

In a fourteenth aspect A14 according to the thirteenth aspect A13, the system further includes an elevating member disposed within the keg and atop the removable keg base, wherein the elevating member is configured to elevate the at least one pouch relative to the removable keg base. In a fifteenth aspect A15 according to the fourteenth aspect A14, the elevating member has a top surface, wherein the top surface of the elevating member is substantially aligned with a bottom of the first aperture. In a sixteenth aspect A16 according to either the fourteenth aspect A14 or the fifteenth aspect A15, the elevating member is integrally formed with the removable keg base. In a seventeenth aspect A17 according to any of the thirteenth through sixteenth aspects A13-A16, the removable keg base is threadedly engaged with the inner surface of the keg. In an eighteenth aspect A18 according to any of the thirteenth through seventeenth aspects A13-A17, the removable keg base comprises a handle.

In a nineteenth aspect A19, a method of assembling a beverage-dispensing apparatus includes: inserting a beverage pouch into an opening at a base of a keg, the keg having a longitudinal axis extending therethrough; positioning a dispensing apparatus of the beverage pouch through a radial aperture of the keg; clipping the dispensing apparatus in place with an outer clip configured to couple to the dispensing apparatus with a snap-fit mechanism; attaching a top of the beverage pouch to an upper attachment element disposed within the keg; and closing the opening at the base of the keg with a removable keg base.

In a twentieth aspect A20 according to the nineteenth aspect A19, the method further includes clipping the dispensing apparatus in place with an inner clip configured to couple to the dispensing apparatus with a snap-fit mechanism.

It is to be understood that both the foregoing general description and the following detailed description describe various embodiments and are intended to provide an overview or framework for understanding the nature and character of the claimed subject matter. The accompanying drawings are included to provide a further understanding of the various embodiments and are incorporated into and constitute a part of this specification. The drawings illustrate the various embodiments described herein, and together with the description, explain the principles and operations of the claimed subject matter.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
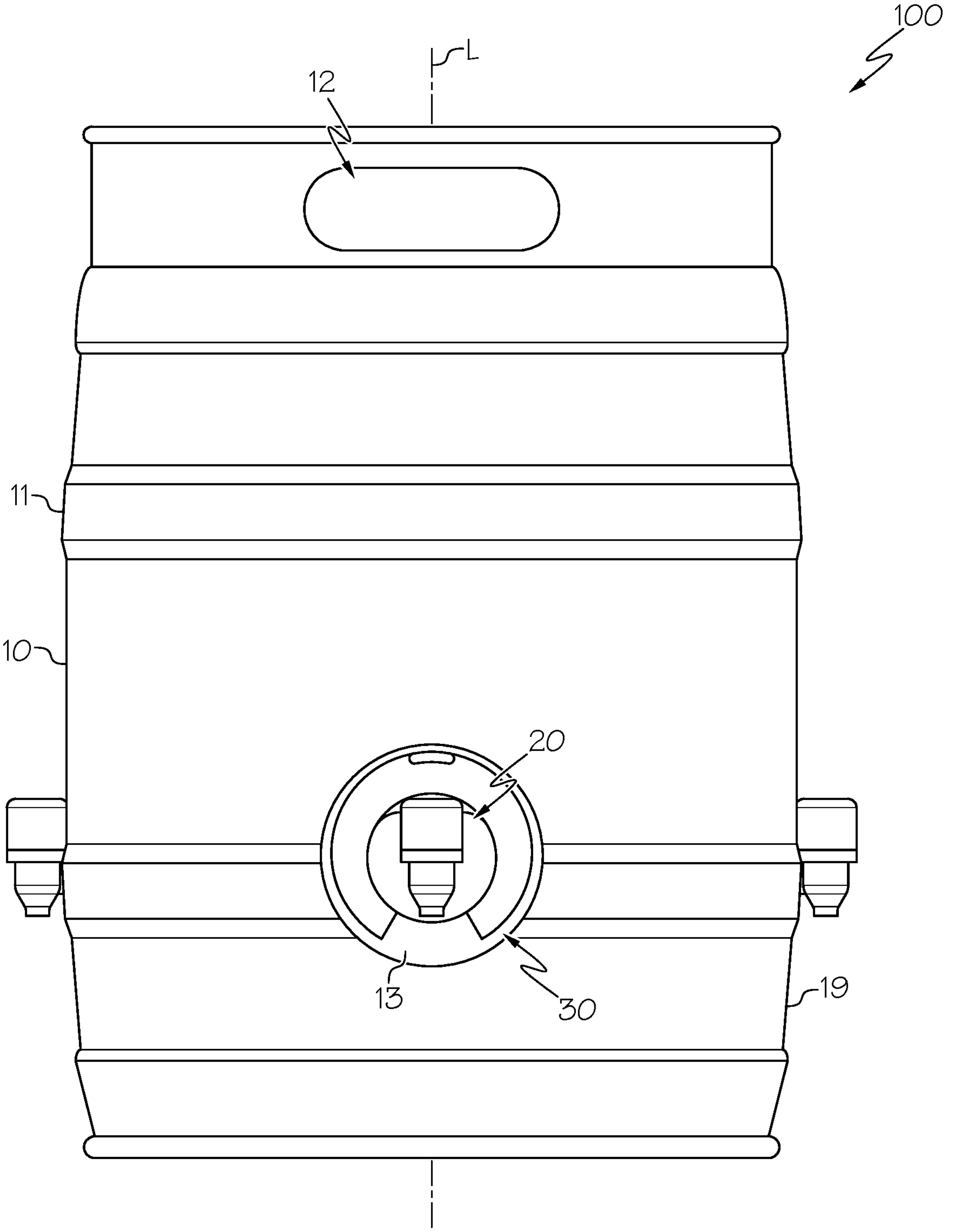
FIG. 1 schematically depicts a front view of a keg, according to one or more embodiments shown and described herein.
Figure 2:
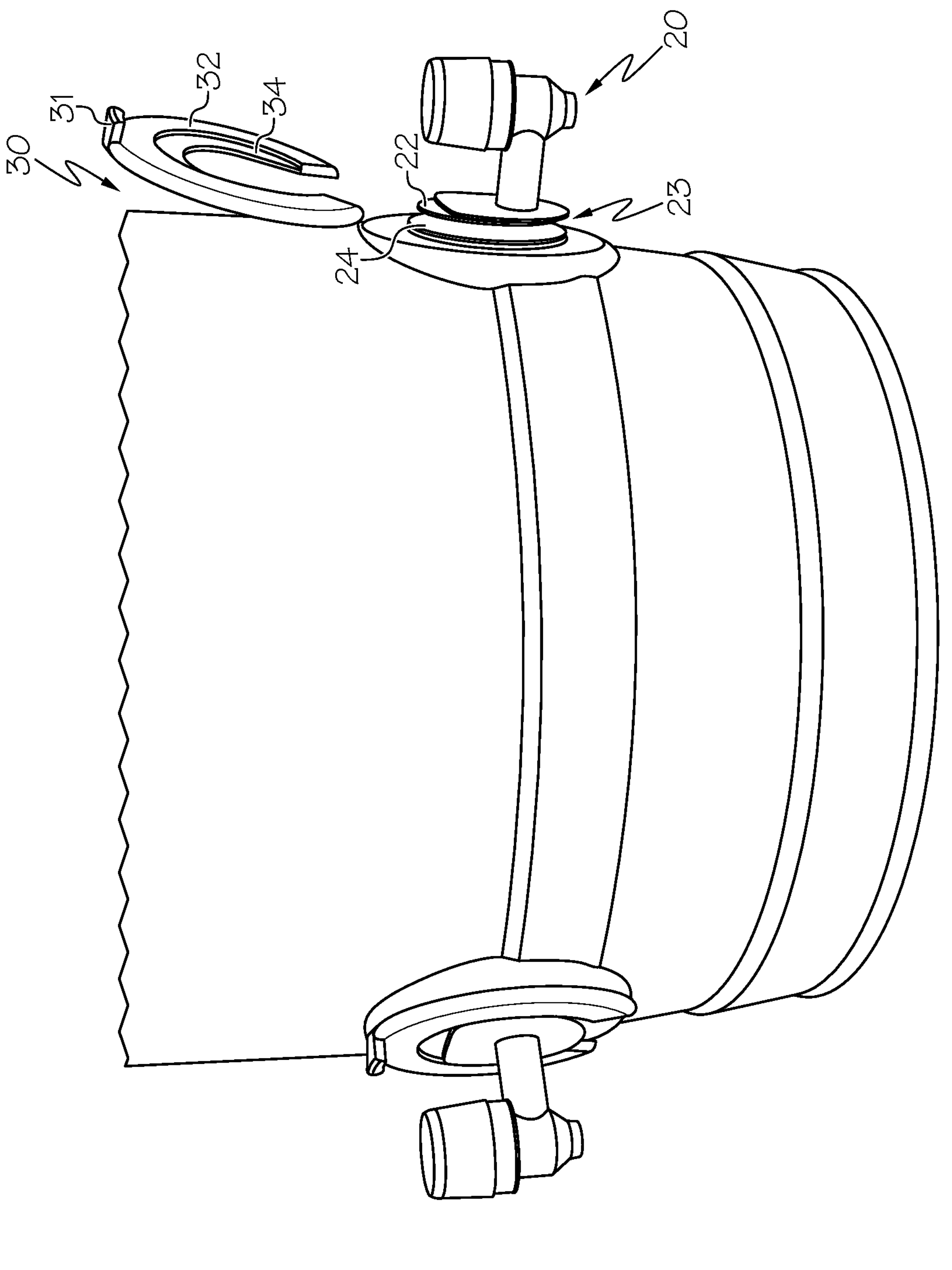
FIG. 2 schematically depicts a side view of the keg of FIG. 1 with the first outer clip in a disassembled state, according to one or more embodiments shown and described herein.

Reference will now be made in detail to various embodiments of devices, assemblies, and methods, examples of which are illustrated in the accompanying drawings. Whenever possible, the same reference numerals will be used throughout the drawings to refer to the same or like parts. FIGS. 1 and 2 schematically depict a keg configured to dispense a beverage from at least one beverage pouch that includes a first nozzle. The keg extends about a longitudinal axis to define an inner surface and an outer surface. The keg defines a first aperture extending from the inner surface of the keg to the outer surface of the keg, wherein the first aperture is configured to receive the first nozzle. The keg generally includes a first outer clip positioned to abut the outer surface of the keg and encircle a first portion of the first nozzle. In this way, the keg may dispense a beverage from the beverage pouch and may prevent the beverage from contacting the inner surface of the keg directly.

Directional terms as used herein—for example up, down, right, left, front, back, top, bottom—are made only with reference to the figures as drawn and are not intended to imply absolute orientation unless otherwise specified.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any device or assembly claim does not actually recite an order or orientation to individual components, or it is not otherwise specifically stated in the claims or description that the steps are to be limited to a specific order, or that a specific order or orientation to components of an device or assembly is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation; and the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

Referring to FIG. 1, an embodiment of a keg 100 for beverage dispensing is schematically depicted. The keg 100 generally includes a body 10 extending about a longitudinal axis L. As will be described in greater detail herein, the beverage-dispensing keg 100 may be configured to receive a dispensing apparatus 20.

Figure 6:
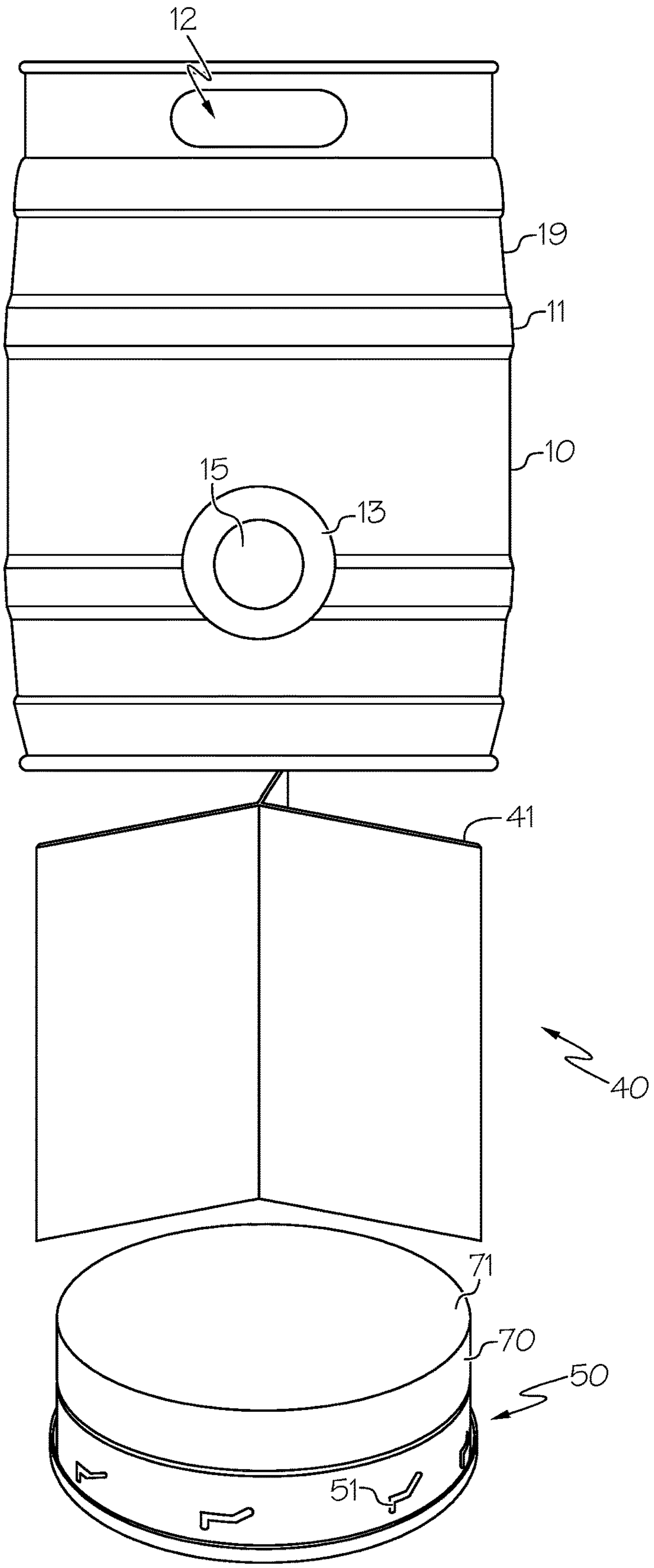
FIG. 6 schematically depicts a front view of an exploded assembly of the keg of FIG. 1, according to one or more embodiments shown and described herein.
Figure 7:
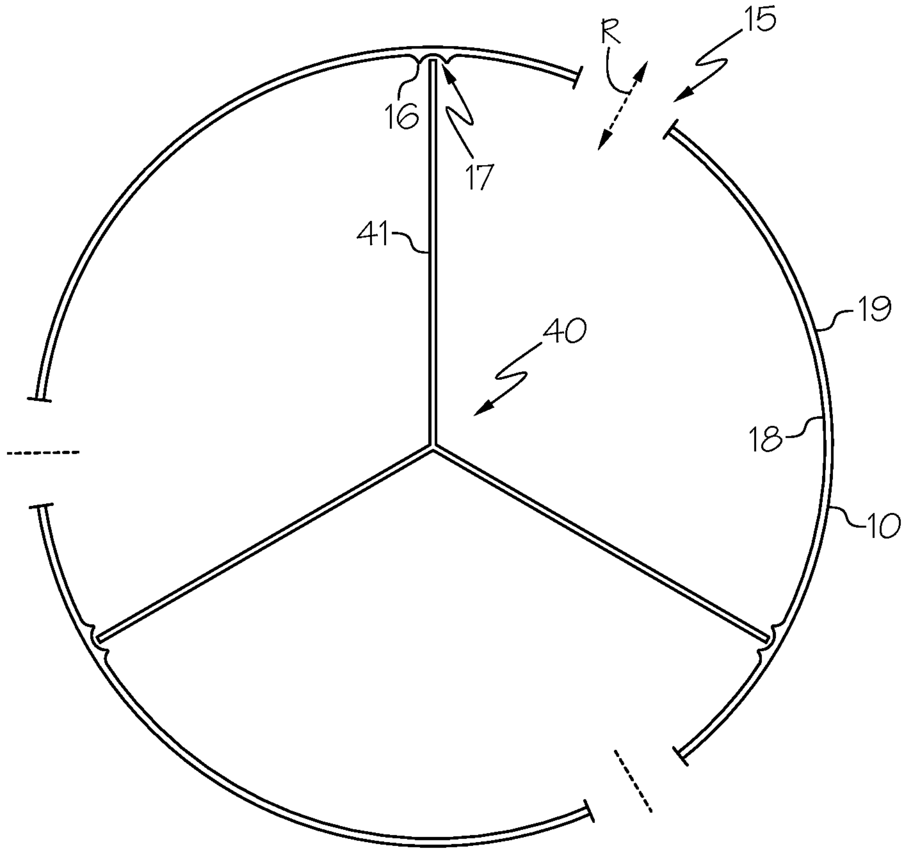
FIG. 7 schematically depicts a top view of a cross section of the keg of FIG. 1, according to one or more embodiments shown and described herein.

Referring briefly to FIGS. 6 and 7 in combination with FIG. 1, the body 10 of the keg 100 may be substantially hollow and may define an outer surface 19 and an inner surface 18. The body 10 may further define one or more apertures 15 that extend from the inner surface 18 to the outer surface 19. The one or more apertures 15 may extend radially outward along a radial axis R that is perpendicular to the longitudinal axis L. As shown, the one or more apertures 15 may be substantially round; however, other shapes are contemplated and possible.

Referring back to FIG. 1, in embodiments, the body 10 may include a boss 13 surrounding the one or more apertures 15. The boss 13 may be raised on the outer surface 19 and may be relatively flat in a direction normal to the radial axis R. As will be described in greater detail herein, the boss 13 may provide a substantially flat surface for mating with a first outer clip 30. In embodiments, the body 10 may include one or more ridges 11. The ridges 11 may be raised on the outer surface 19 and surround a circumference of the body 10. In this way, the keg 100 may have an appearance reminiscent of a traditional stainless steel or wooden keg. In embodiments, the body 10 may define one or more top handles 12. The top handles 12 may extend radially outward from the inner surface 18 to the outer surface 19. The top handles 12 may be configured for ease of carrying. For example, the top handles 12 may have a rounded, elongated shape; however, other shapes are contemplated and possible.

Figure 3:
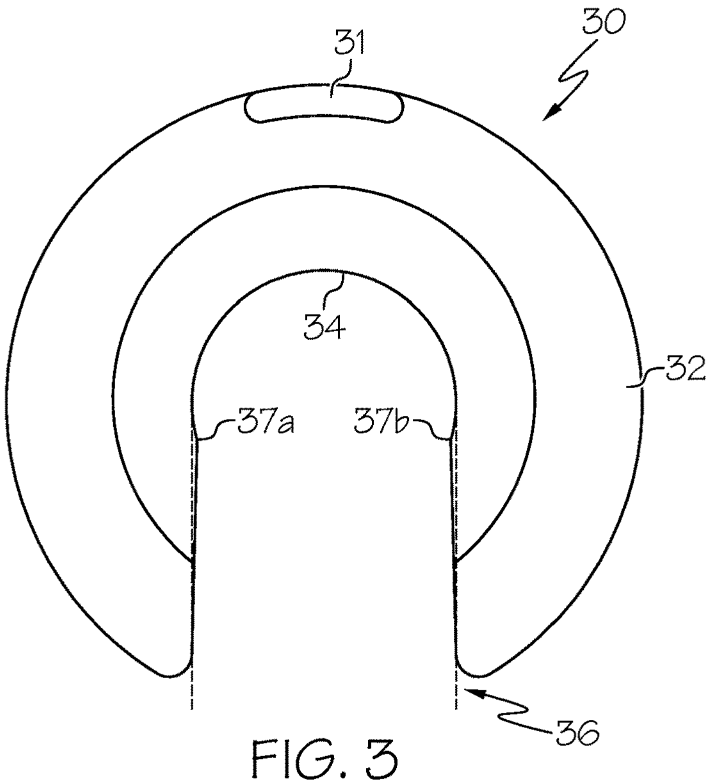
FIG. 3 schematically depicts a front view of the first outer clip of the beverage-dispensing keg of FIG. 1, according to one or more embodiments shown and described herein.

Referring to FIGS. 2 and 3, a first outer clip 30 is schematically depicted. As depicted, the first outer clip 30 may be substantially round. However, other shapes are contemplated and possible. The first outer clip may define a receiving path 36 such that the receiving path 36 extends through a portion of the first outer clip 30. The first outer clip 30 may include one or more snap-fit mechanisms such as snap-fit mechanism 37*a* and 37*b*. Snap-fit mechanisms 37*a* and 37*b* may extend into the receiving path 36. The first outer clip 30 may further include a tab 31 raised on the first outer clip 30 and disposed above the receiving path 36. When assembled, as will be described in greater detail herein, the tab 31 may extend in the radially outward direction, as defined by radial axis R. The first outer clip 30 may further include an outer part 32 and an inner part 34, disposed within the outer part 32. The inner part 34 may be recessed relative to the outer part 32.

Figure 4:
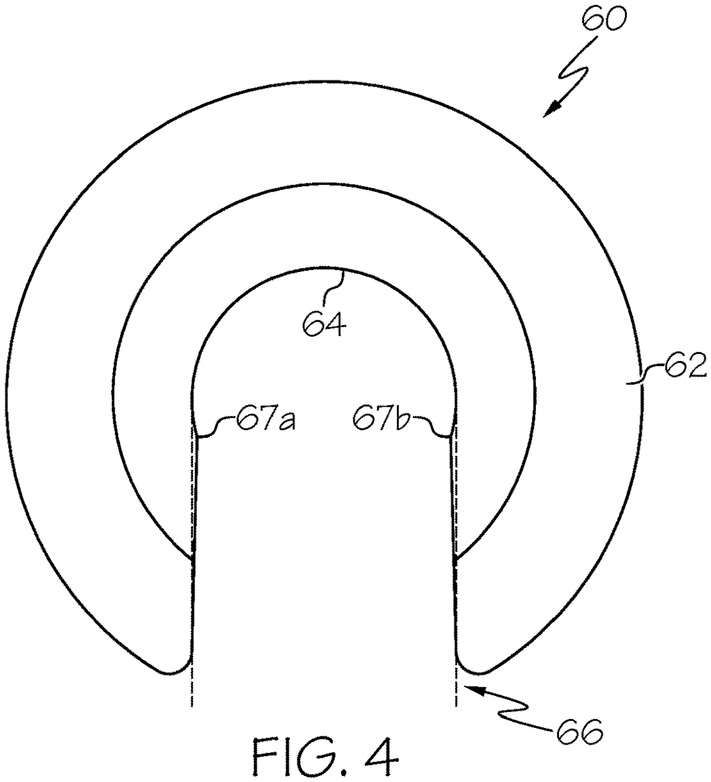
FIG. 4 schematically depicts a front view of the first inner clip of the beverage-dispensing keg of FIG. 1, according to one or more embodiments shown and described herein.

Referring to FIG. 4, a first inner clip 60 is schematically depicted. Similar to the first outer clip 30, the first inner clip 60 may include a receiving path 66, snap-fit mechanisms 67*a* and 67*b*, an outer part 62, and an inner part 64, such as described above. As shown, the first inner clip 60 may not have a tab similar to tab 31 described above. However, in other embodiments, a tab raised on the first inner clip 60 and disposed above the receiving path 66 may be included.

Figure 5A:
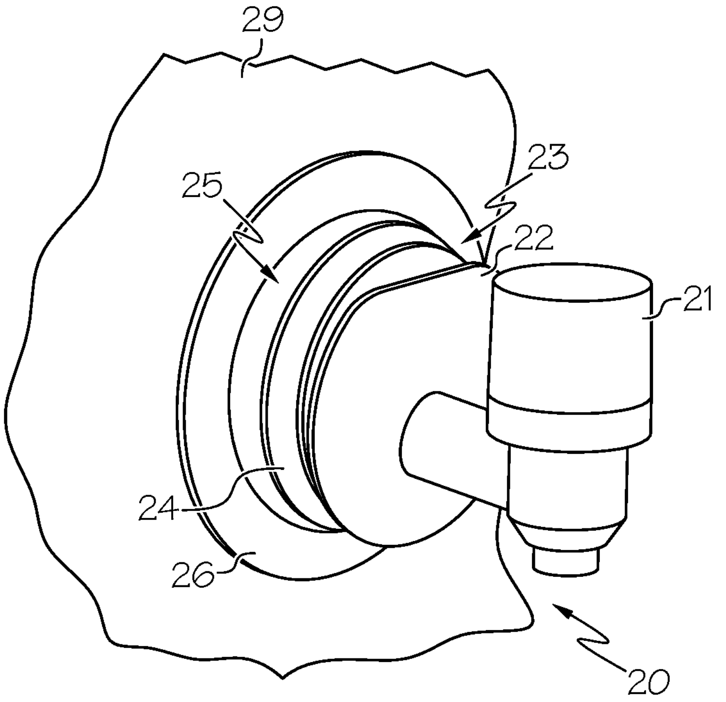
FIG. 5A schematically depicts a perspective view of a dispensing apparatus, according to one or more embodiments shown and described herein.
Figure 5B:
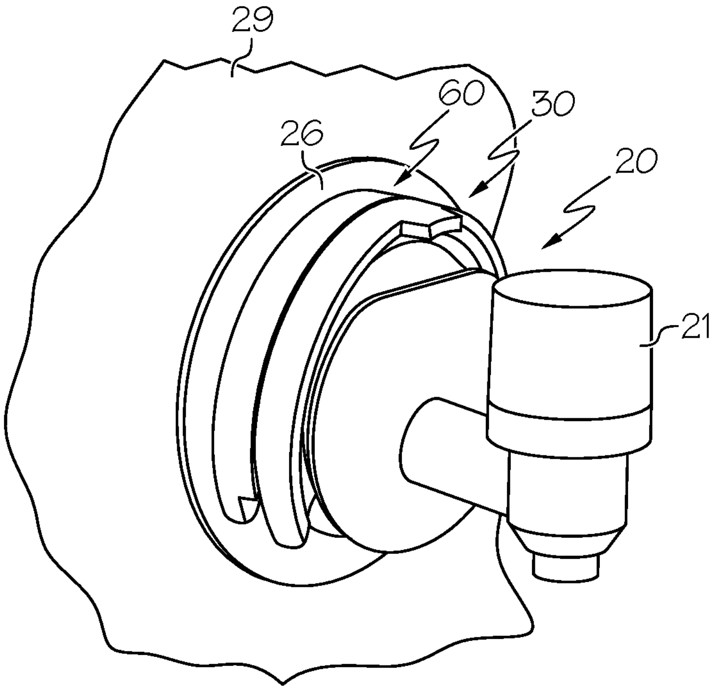
FIG. 5B schematically depicts a perspective view of the dispensing apparatus of FIG. 5 assembled with the first outer clip of FIG. 3 and the first inner clip of FIG. 4, according to one or more embodiments shown and described herein.

Referring to FIGS. 5A and 5B, a partial assembly of the first inner clip 60 and the first outer clip 30 on the dispensing apparatus 20 is schematically depicted. The dispensing apparatus 20 may be coupled to a beverage pouch 29, which may contain a beverage for dispensing. The dispensing apparatus 20 may generally include a nozzle 21 for dispensing the beverage. The nozzle 21 may be moveable between an open position and a closed position such that the beverage may be dispensed when the nozzle 21 is in the open position and the beverage may be retained within the beverage pouch 29 when the nozzle 21 is in the closed position. The dispensing apparatus 20 may be coupled to the beverage pouch 29 at an attachment surface 26 of the dispensing apparatus 20. The attachment surface 26 may be extend about the radial axis R and may be spaced apart from the nozzle 21 along the radial axis R. The beverage pouch 29 may be coupled to the dispensing apparatus 20 at the attachment surface 26 via adhesive, clamp, tie, or any other suitable attachment. The attachment surface 26 may be more rigid than the beverage pouch 29 such that the attachment surface 26 resists deformation. In this way, the attachment surface 26 may prevent unwanted strain on the coupling between the beverage pouch 29 and the dispensing apparatus 20.

Disposed between the nozzle 21 and the attachment surface 26, the dispensing apparatus may have one or more ridges, such as first ridge 22 and second ridge 24. The first ridge 22 and the second ridge 24 may extend about the radial axis R. The first ridge 22 and the second ridge 24 may be spaced apart from each other along the radial axis R such that they define a first groove 23 disposed therebetween. The second ridge 24 and the attachment surface 16 may also be spaced apart from each other along the radial axis R such that they define a second groove 25 disposed therebetween.

The first outer clip 30 and the first inner clip 60 may be configured to mate with the first groove 23 and the second groove 25, respectively. In particular, the first groove 23 may be larger in the direction of the radial axis R than the inner part 34 of the first outer clip 30. In this way, the inner part 34 of the first outer clip 30 may be positioned within the first groove 23. The first groove may be smaller in a diametric direction perpendicular to the radial axis R than the receiving path 36 of the first outer clip 30. In this way, the first groove 23 may fit within the receiving path 36. Accordingly, the first outer clip 30 may at least partially encircle the first groove 23 of the dispensing apparatus 20.

As described above, the first outer clip 30 may include snap-fit mechanisms 37*a* and 37*b*, which extend into the receiving path 36. Accordingly, at the snap-fit mechanisms 37*a* and 37*b*, the first outer clip may have a minimum width smaller than the diameter of the first groove 23 of the dispensing apparatus 20. In this way, the snap-fit mechanisms 37*a* and 37*b* may retain the first outer clip 30 in place about the dispensing apparatus 20 until acted upon by a threshold force. In embodiments, the first outer clip 30 may include a tab 31 disposed above the receiving path 36. The tab 31 may extend radially outward from the first outer clip 30 relative to the longitudinal axis L. Accordingly, by exerting a lifting force on the tab 31 that is greater than or equal to the threshold force required to overcome the retention of the snap-fit mechanisms 37*a* and 37*b*, the first outer clip 30 may be detached from the dispensing apparatus 20.

The first inner clip 60 may be similarly configured to mate with the second groove 25. In particular, the second groove 25 may be larger in the direction of the radial axis R than the inner part 64 of the first inner clip 60. In this way, the inner part 64 of the first inner clip 60 may be positioned within the second groove 25. The first groove may be smaller in a diametric direction perpendicular to the radial axis R than the receiving path 66 of the first inner clip 60. In this way, the second groove 25 may fit within the receiving path 66. Accordingly, the first inner clip 60 may encircle the second groove 25 of the dispensing apparatus 20. As described above, the first inner clip 60 may include snap-fit mechanisms 67*a* and 67*b*, which extend into the receiving path 66. The snap-fit mechanisms 67*a* and 67*b* may retain the first inner clip 60 in place about the dispensing apparatus 20 until acted upon by a threshold force.

As shown particularly in FIG. 5B, when assembled with the dispensing apparatus 20, the first outer clip 30 and the first inner clip 60 may be spaced apart from each other along the radial axis R. This spacing may allow the first outer clip 30 to be positioned to abut the outer surface 19 of the keg 100 and the first inner clip 60 to abut the inner surface 18 of the keg 100 when assembled with the keg 100.

Referring to FIG. 2 and FIGS. 5A-5B in combination, assembly of the beverage pouch 29 within the keg 100 may include clipping the first inner clip 60 to the dispensing apparatus 20. More specifically, assembly may include clipping the first inner clip 60 about the second groove 25 of the dispensing apparatus 20. Assembly may include inserting the beverage pouch 29 and the dispensing apparatus 20 with the first inner clip 60 within the keg 100. Assembly may further include positioned the dispensing apparatus 20 through the one or more apertures 15. As depicted in FIG. 2, the first inner clip 60 may not be visible from the outer surface 19 of the keg 100. Instead, the first inner clip 60 may abut the inner surface 18 of the keg 100. Assembly may further include clipping the first outer clip 30 to the dispensing apparatus 20. In particular, the first outer clip 30 may be clipped to the first groove 23 of the dispensing apparatus 20. As depicted, the first outer clip 30 may abut the outer surface 19 of the keg 100 when assembled. In this way, the first outer clip 30 may clip the dispensing apparatus 20 in place relative to the keg 100.

In embodiments, the keg 100 may include more than one dispensing apparatus and more than one beverage pouch. For example, the keg 100 may include two or more beverage pouches, each coupled to a dispensing apparatus. In such embodiments, the assembly of each dispensing apparatus and beverage pouch may be substantially similar to the assembly described above. For example, the keg 100 may define a second aperture that extends radially outward from the inner surface 18 to the outer surface 19. The second aperture may receive a second dispensing apparatus, and the second dispensing apparatus may be clipped in place via a second outer clip. Accordingly, the assembly described above may be repeated for each dispensing apparatus and beverage pouch.

Figure 8:
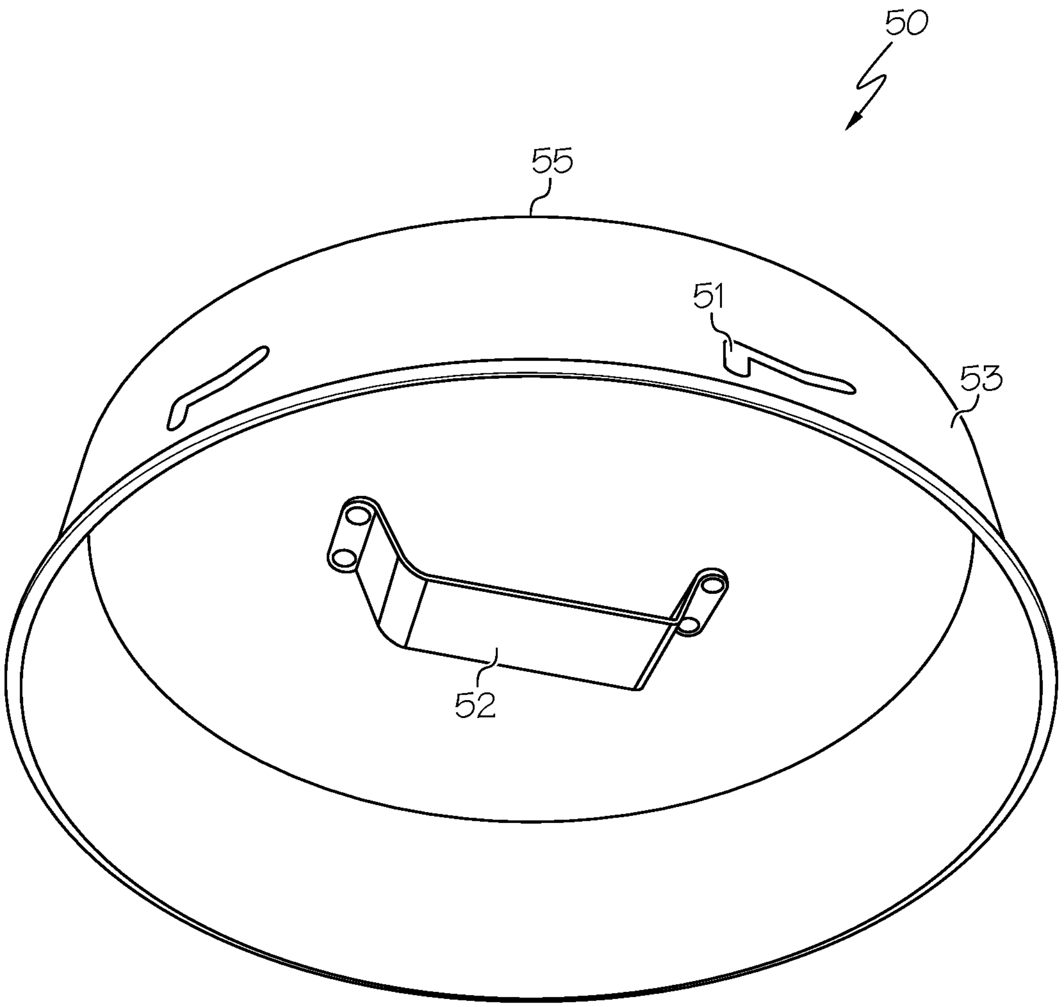
FIG. 8 schematically depicts a bottom perspective view of a removable base of the keg of FIG. 1, according to one or more embodiments shown and described herein.

Referring now to FIGS. 6-8 in combination, an exploded assembly of the keg 100 is schematically depicted. As depicted, the keg 100 may further include a removable base 50. The removable base 50 may be configured to selectively couple to the keg 100. In embodiments, the removable base 50 may include a recessed surface 55, an outer lip 54, and a side wall 53 disposed therebetween. The recessed surface may be recessed relative to the outer lip 54 along the longitudinal axis L. The side wall 53 may extend between the recessed surface 55 and the outer lip 54. As depicted, the side wall 53 may be substantially round. The side wall 53 may be diametrically sized slightly smaller than the inner surface 18 of the keg 100 such that it may be assembled within the inner surface 18 of the keg 100. The side wall may include a retention feature, such as threads 51. The threads 51 may threadedly engage with a mating feature (not shown) on the inner surface 18 of the keg 100 to selectively couple the removable base 50 to the keg 100. In other embodiments, the retention feature may be a press-fit connection, interference fit connection, or any other suitable connection between the removable base 50 and the keg 100. The removable base 50 may further include a handle 52 disposed on the recessed surface 55. The handle 52 may extend a distance from the recessed surface 55 such that a user can grasp the handle. Accordingly, the handle 52 may operate as an easy grasping location to assist in engaging or disengaging the removable base 50 with the keg 100. The handle 52 may also operate as an easy grasping location to lift or carry the keg 100. The handle 52 may extend a distance from the recessed surface 55 that is shorter than the side wall 53 so that it does not extend past the side wall 53.

The keg 100 may further include an elevating member 70. The elevating member 70 may be diametrically sized smaller than the inner surface 18 of the keg 100 so that it may be assembled within the keg 100. The elevating member may extend a distance along the longitudinal axis L to define a top surface 71. In particular, the top surface 71 of the elevating member 70 may be configured to align with the bottom of the one or more apertures 15 when assembled within the keg 100. In this way, the elevating member may elevate a component disposed within the keg 100, such as the beverage pouch 29, relative to the removable base 50 so that it aligns with the one or more apertures 15. In this way, a beverage contained within the beverage pouch 29 may be dispensed via gravity when assembled and when the nozzle 21 is in an open position. It is noted that, in other embodiments, the elevating member 70 may not be distinctly included. Instead, the removable base 50 may be sized to align with the bottom of the one or more apertures 15 when assembled.

In embodiments, and in particular in embodiments including more than one beverage pouch, it may be beneficial to section volumes within the keg 100. Accordingly, the keg 100 may include a divider 40. The divider 40 may extend through the keg 100 along the longitudinal axis L. The divider 40 may include a plurality of walls 41 that extend radially from the longitudinal axis L to contact the inner surface 18 of the keg 100 when assembled. As depicted, the divider 40 includes three walls 41. However, more or fewer walls are contemplated and possible.

The keg 100 may include a plurality of raised borders 16 disposed on the inner surface 18. The raised borders 16 may extend along the inner surface 18 in the longitudinal direction, as defined by the longitudinal axis L. The raised borders 16 may be spaced about the inner surface 18 to define a plurality of divider channels 17. The divider channels 17 may be configured to receive the walls 41 of the divider 40 therein. Accordingly, the divider channels 17 may fix the orientation of the divider 40 within the keg 100.

Still referring to FIGS. 6 and 7, assembly of the keg 100 may include inserting the divider 40 into the keg 100 such that the walls 41 are each disposed within one of the divider channels 17. The assembly may include inserting a beverage pouch 29 coupled to a dispensing device into the keg 100. In particular, the beverage pouch 29 may be inserted between the walls 41 of the divider 40. The beverage pouch 29 and the dispensing device 20 may then be clipped in place substantially as described above.

In embodiments, the assembly may further include inserting a second beverage pouch coupled to a second dispensing device into a second space defined by the divider. The second beverage pouch and second dispensing device may then be clipped in place substantially as described above. As will be appreciated, a third or fourth beverage pouch may be assembled in substantially the same way.

The assembly may further include inserting an elevating member 70 into the keg 100. Accordingly, the elevating member 70 may elevate the beverage pouch 29 and any additional beverage pouches disposed within the keg 100. The assembly may further include coupling the removable base 50 to the keg 100. In embodiments, coupling the removable base 50 to the keg 100 may include inserting the removable base 50 into the keg 100 and rotating the removable base 50 to engage the threads 51 with the keg 100.

In view of the above, it should now be understood that at least some embodiments of the present disclosure are directed to a keg that is configured to dispense a beverage from at least one beverage pouch that includes a first nozzle. The keg extends about a longitudinal axis to define an inner surface and an outer surface. The keg defines a first aperture extending from the inner surface of the keg to the outer surface of the keg, wherein the first aperture is configured to receive the first nozzle. The keg generally includes a first outer clip positioned to abut the outer surface of the keg and encircle a first portion of the first nozzle. In this way, the keg may dispense a beverage from the beverage pouch by gravity and may prevent the beverage from contacting the inner surface of the keg directly.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A system for dispensing a beverage from at least one pouch having a first dispensing apparatus comprising an outer groove, the system comprising:

a keg defining a longitudinal axis, an inner surface, and an outer surface;

a first aperture extending from the inner surface of the keg to the outer surface of the keg, the first aperture configured to receive the first dispensing apparatus; and a first outer clip comprising a receiving path, the first outer clip positioned to abut the outer surface of the keg and encircle a first portion of the first dispensing apparatus, wherein the first outer clip is configured to couple to the outer groove of the first dispensing apparatus with a snap-fit mechanism through the receiving path of the first outer clip.

2. The system of claim 1, wherein the first aperture extends radially outward relative to the longitudinal axis of the keg.

3. The system of claim 1, wherein the outer groove defines a groove diameter, and the first outer clip has a minimum width smaller than the groove diameter.

4. The system of claim 1, further comprising a first inner clip positioned to abut the inner surface of the keg and encircle a second portion of the first dispensing apparatus.

5. The system of claim 4, wherein the first dispensing apparatus comprises an inner groove, wherein the first inner clip comprises a receiving path, wherein the first inner clip is configured to couple to the inner groove of the first dispensing apparatus with a snap-fit mechanism through the receiving path of the first inner clip.

6. The system of claim 1, wherein the first outer clip comprises a tab extending radially outward relative to the longitudinal axis of the keg.

7. The system of claim 1, wherein the keg comprises a removable keg base, longitudinally recessed within the keg.

8. The system of claim 1, further comprising a second aperture extending from the inner surface of the keg to the outer surface of the keg, the second aperture configured to receive a second dispensing apparatus of the at least one pouch.

9. The system of claim 8 further comprising a second outer clip configured to couple to the second dispensing apparatus.

10. The system of claim 1, further comprising a divider, the divider defining a plurality of radially extending walls, wherein the divider is configured to receive the at least one pouch between the plurality of radially extending walls.

11. The system of claim 10, wherein the keg comprises a plurality of divider channels, each of the plurality of divider channels configured to receive one of the plurality of radially extending walls.

12. A system for dispensing liquor from at least one pouch having a first dispensing apparatus, the system comprising:

a keg defining a longitudinal axis, an inner surface, and an outer surface;

a removable keg base coupled to a bottom of the keg;

an elevating member disposed within the keg and atop the removable keg base, wherein the elevating member is configured to elevate the at least one pouch relative to the removable keg base;

a first aperture radially extending from the inner surface of the keg to the outer surface of the keg, the first aperture configured to receive the first dispensing apparatus; and a first outer clip positioned to abut the outer surface and encircle a second portion of the first dispensing apparatus.

13. The system of claim 12, wherein the elevating member has a top surface, wherein the top surface of the elevating member is substantially aligned with a bottom of the first aperture.

14. The system of claim 12, wherein the elevating member is integrally formed with the removable keg base.

15. The system of claim 12, wherein the removable keg base is threadedly engaged with the inner surface of the keg.

16. The system of claim 12, wherein the removable keg base comprises a handle.

17. A method of assembling a beverage-dispensing apparatus comprising:

inserting a beverage pouch into an opening at a base of a keg, the keg having a longitudinal axis extending therethrough;

positioning a dispensing apparatus of the beverage pouch through a radial aperture of the keg;

clipping the dispensing apparatus in place with an outer clip comprising a receiving path, the outer clip configured to couple to the dispensing apparatus with a snap-fit mechanism through the receiving path of the outer clip;

attaching a top of the beverage pouch to an upper attachment element disposed within the keg; and closing the opening at the base of the keg with a removable keg base.

18. The method of claim 17 further comprising clipping the dispensing apparatus in place with an inner clip comprising a receiving path, the inner clip configured to couple to the dispensing apparatus with a snap-fit mechanism through the receiving path of the inner clip.

* * * * *